United States Patent
Liu et al.

(10) Patent No.: US 10,853,576 B2
(45) Date of Patent: Dec. 1, 2020

(54) EFFICIENT AND ACCURATE NAMED ENTITY RECOGNITION METHOD AND APPARATUS

(71) Applicant: Hong Kong Applied Science and Technology Research Institute Company Limited, Hong Kong (HK)

(72) Inventors: Yang Liu, Hong Kong (HK); Zhixi Li, Shenzhen (CN); Chao Feng, Shenzhen (CN); Yi Ping Tse, Hong Kong (HK); Zhi Bin Lei, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 126 days.

(21) Appl. No.: 16/219,887

(22) Filed: Dec. 13, 2018

(65) Prior Publication Data
US 2020/0192979 A1 Jun. 18, 2020

(51) Int. Cl.
*G06F 40/295* (2020.01)
*G06K 9/62* (2006.01)
*G06F 17/18* (2006.01)

(52) U.S. Cl.
CPC ............ *G06F 40/295* (2020.01); *G06F 17/18* (2013.01); *G06K 9/628* (2013.01); *G06K 9/6218* (2013.01); *G06K 9/6256* (2013.01)

(58) Field of Classification Search
CPC ..... G06F 40/295; G06F 17/18; G06K 9/6218; G06K 9/6256; G06K 9/628; G10L 15/223; G10L 15/0635; G10L 25/48
See application file for complete search history.

(56) References Cited

U.S. PATENT DOCUMENTS 7,117,432 B1 * 10/2006 Shanahan ............. G06F 16/353
715/210
10,089,981 B1 * 10/2018 Elangovan ............. G10L 15/22
(Continued)

FOREIGN PATENT DOCUMENTS

CN 106066856 A 11/2016
CN 107832296 A 3/2018

OTHER PUBLICATIONS

Alireza M. et. al., "Named Entity Recognition Approaches", International Journal of Computer Science and Network Security, vol. 8, No. 2, Feb. 2008, p. 339-344.
(Continued)

*Primary Examiner* — Mohammad K Islam
(74) *Attorney, Agent, or Firm* — Idea Intellectual Limited; Margaret A. Burke; Sam T. Yip (57) ABSTRACT

A method for recognizing and extracting named entities in a natural language input text processing comprising: performing, by a compressed named entities recognition (NER)-model-based named entity recognizer, a first stage NER on the input text to generate a first stage determination of whether at least one named entity exists in the input text; if the first stage NER determines no named entity exists in the input text, performing, by a rule based named entity recognizer, a second stage NER on the input text to generate a second stage NER result; if the first stage NER determines at least one named entity exists in the input text, generating, by the compressed NER-model-based named entity recognizer, a first stage NER result; and integrating, by a NER result integrator, the first stage NER result and the second stage NER result to generate a final NER result.

15 Claims, 5 Drawing Sheets

(56) References Cited

U.S. PATENT DOCUMENTS

| | | | |
|---|---|---|---|
| 10,448,115 B1* | 10/2019 | Jamal | H04N 21/4828 |
| 10,482,904 B1* | 11/2019 | Hardie | G10L 15/22 |
| 2014/0288932 A1* | 9/2014 | Yeracaris | G10L 15/30 |
| | | | 704/249 |
| 2016/0300573 A1* | 10/2016 | Carbune | G06F 40/174 |
| 2018/0232201 A1* | 8/2018 | Holtmann | G06F 3/0482 |
| 2019/0295537 A1* | 9/2019 | Sapugay | G06N 20/00 |
| 2020/0151389 A1* | 5/2020 | Murphy | G06F 16/93 |
| 2020/0183648 A1* | 6/2020 | Thangarathnam | G10L 15/22 |
| 2020/0184992 A1* | 6/2020 | Newell | G10L 15/22 |

OTHER PUBLICATIONS

International Search Report of PCT/CN2018/121846 dated Mar. 1, 2019.

\* cited by examiner

EFFICIENT AND ACCURATE NAMED ENTITY RECOGNITION METHOD AND APPARATUS

FIELD OF THE INVENTION

The present invention relates to natural language processing (NLP) and particularly to methods, techniques, devices, and systems for named entity recognition and extraction in documents, where the named entities may be categorized into classes and types.

BACKGROUND OF THE INVENTION

The goal of automated systems for recognizing named entities is to be able to recognize and extract named entities from digital documents or texts and categorized those named entity mentions into one or more pre-specified classes or types such as person, city, automobile, and others. The downstream applications of the named entity recognition and extraction results are vast and include improving information retrieval systems and knowledge extraction systems among many others.

One such named entity recognition (NER) technique models words and characters in and contexts of digital documents and texts using vectors. These vectors can be viewed as numeric representations of the words, characters, and contexts in a multi-dimensional space and form a training dataset for training the NER system. The vector of a word has a direct relationship to its meanings. An example vector of the word "in" is:

[0.33042  0.24995  −0.60874  0.10923  0.036372  0.151
 −0.55083  −0.074239  −0.092307  −0.32821  0.09598
 −0.82269  −0.36717  −0.67009  0.42909  0.016496
 −0.23573  0.12864  −1.0953  0.43334  0.57067  −0.1036
 0.20422  0.078308  −0.42795  −1.7984  −0.27865  0.11954
 −0.12689  0.031744  3.8631  −0.17786  −0.082434
 −0.62698  0.26497  −0.057185  −0.073521  0.46103
 0.30862  0.12498  −0.48609  −0.0080272  0.031184
 −0.36576  −0.42699  0.42164  −0.11666  −0.50703
 −0.027273  −0.53285]

Figure 1:
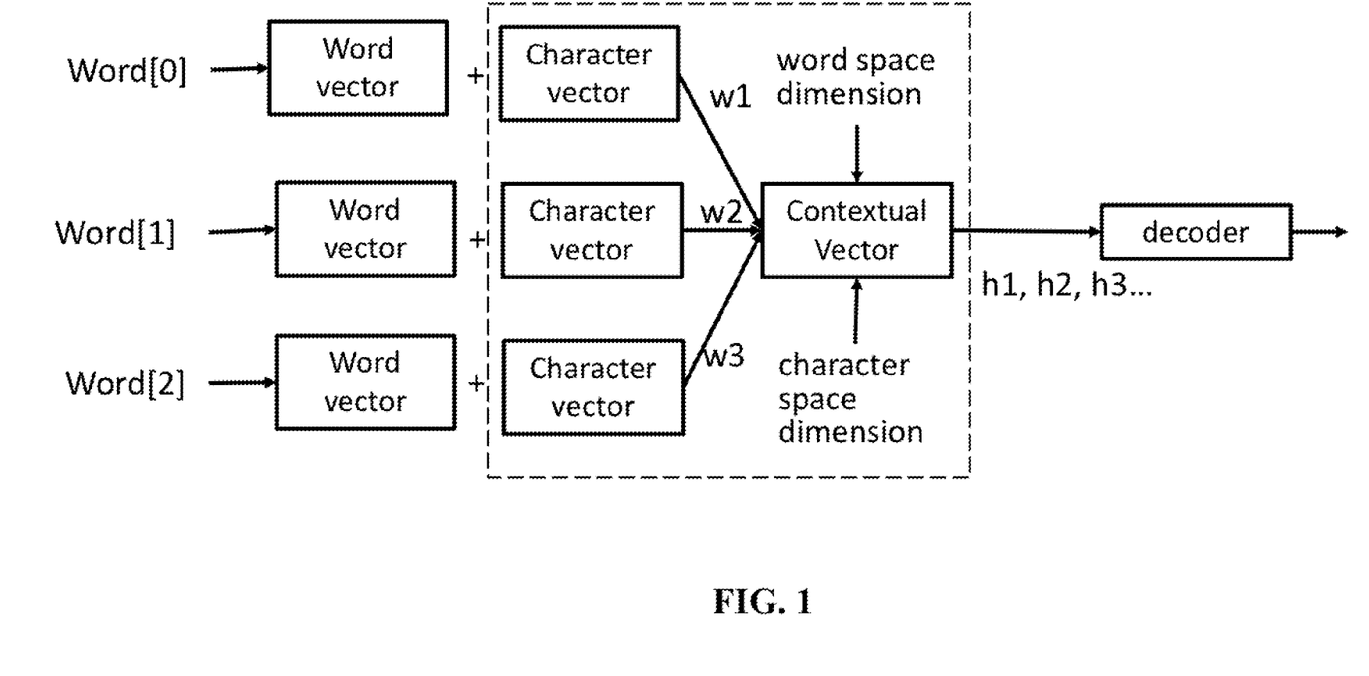
FIG. 1 illustrate the logical formation of a NER system training dataset from word vectors, character vectors, and context vectors in multi-dimensional spaces.

FIG. 1 illustrates the logical formation of such training dataset from word vectors, character vectors, and context vectors. Such pre-trained NER system can achieve high degree of accuracy but it requires an enormous training dataset of vectors, making it unsuitable for use in resource-limited mobile devices. For example, NER on text messages exchanged in the popular short message service (SMS) is very much constrained by the computing power and memory capacity of the mobile phone. Most of the currently available implementations can only detect telephone numbers or hyperlinks using regular expressions. However, telephone numbers and hyperlinks are not the only valuable named entities. Geographical locations, names, telephone numbers, dates and times are all important information that the user may want to use in other applications. For example, the user may want to perform a map search on a location name contained in a SMS message. Being able to recognize these named entities is the first step towards allowing these data to be exchanged with other applications and/or system with complete automation or at least minimal user intervention. Furthermore, the identification of certain entities such as persons, organizations, and places are challenging yet valuable, since these types of entities are often affected by the passing of time, while being major constituents in documents and text messages.

In general, in order to build a NER system having a high recognition accuracy rate, a large training data set is necessary and consequently a substantially sized NER system. Therefore, traditional NER may not be suitable for mobile devices. There is an unmet need to have a NER system that has a small memory size requirement yet can maintain high recognition accuracy rate.

SUMMARY OF THE INVENTION

The present invention provides a method and an apparatus for recognizing and extracting named entities from digital documents and texts. In accordance to one aspect of the present invention, a first stage named entity recognizer based on a compressed NER model is provided. In accordance to another aspect of the present invention, a second stage rule based named entity recognizer is provided. In accordance to a preferred embodiment, a NER system incorporating both the compressed NER model-based named entity recognizer and the rule based named entity recognizer is provided. Such NER system has a much smaller memory footprint without sacrificing recognition accuracy in comparison with traditional NER systems. Further, due to the NER system's reduced memory footprint, operation speed is also enhanced. In accordance to alternative embodiment, a NER system using only the compressed NER model-based named entity recognizer is also viable. In accordance to yet another embodiment, the rule based named entity recognizer can be incorporated in and work in conjunction with other NER systems or devices to enhance recognition accuracy.

In accordance to one embodiment, the compressed NER model-based named entity recognizer is trained using a training dataset comprising annotated corpus optimized by a Vector Table Optimization and a parameters optimization. The Vector Table Optimization comprises clustering of sentences in a training dataset by word vectors; a selection of corpus from each cluster for inclusion in the training, wherein the selected corpus has not yet been selected previously for the present training dataset; and the omission of certain data in the training dataset. In one embodiment, the parameters optimization comprises at least simplifying the data representation of characters using a lesser-memory-consuming data scheme in place of the multi-dimensional character vectors. In an exemplary embodiment, the least-memory-consuming data scheme is using a single binary bit with a "1" value for a word starting with an uppercase letter and "0" value for a word starting with a lowercase letter. This way, the resulting compressed NER model-based named entity recognizer can achieve significant reduction of memory size requirement.

In accordance to one embodiment, the rule based named entity recognizer comprises a common rules module and a specific rules module. The existences of named entities in documents and texts often exhibit certain common features. These common features include most frequently used words; and part-of-speech (POS) tagging of words, wherein in accordance to one embodiment the optimal POS tagging is determined by Genetic Algorithm. The common rules module is a classifier trained with common features to discover and identify named entities in documents and texts.

Different classes or types and languages of named entities can have different rules of recognition by regular expression methods. The rules of recognition by regular expression can be obtained from named dictionaries of classes or types and languages of named entities. For example, for geographic location type of named entities in English, the rule of recognition by regular expression may be "all words that begin with capital letters after one of the prepositions (in, on, at, to, from, and towards) is a geographic location." The specific rules module is another classifier trained with these rules of recognition by regular expression of a specific class or type and/or language of named entities. In cases where multiple classes or types and/or languages of named entities are to be recognized and extracted, multiple rule based named entity recognizers may be employed each containing a specific rules modules trained specifically for one class or type of named entities.

BRIEF DESCRIPTION OF THE DRAWINGS

Embodiments of the invention are described in more detail hereinafter with reference to the drawings, in which.

DETAILED DESCRIPTION

In the following description, methods and apparatuses for recognizing and extracting named entities from digital documents and texts, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 2:
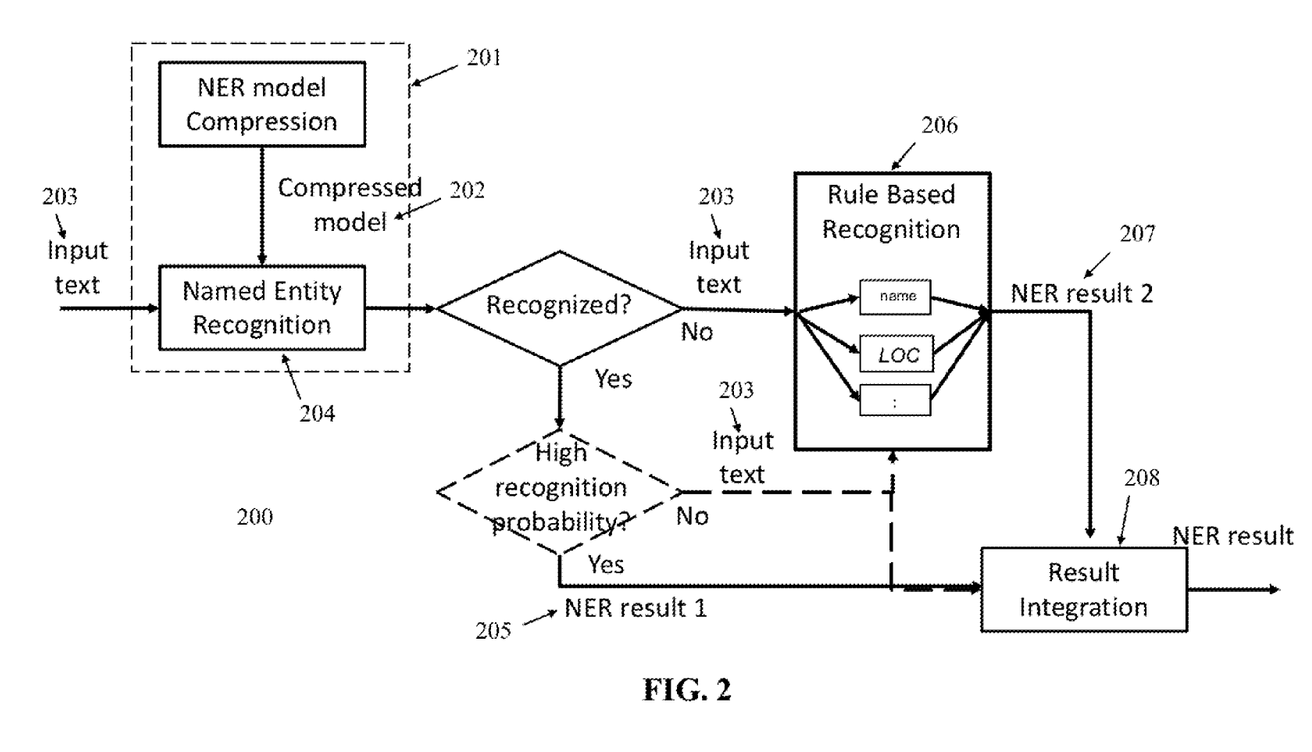
FIG. 2 depicts a logical structural and dataflow diagram of a NER system in accordance to one embodiment of the present invention.

Referring to FIG. 2. In accordance to one aspect of the present invention, a first stage named entity recognizer 204 trained using a compressed NER model 202 (compressed NER model-based named entity recognizer 201) is provided. In accordance to another aspect of the present invention, a second stage rule based named entity recognizer 206 is provided. In accordance to a preferred embodiment, a NER system 200 incorporating both the compressed NER model-based named entity recognizer and the rule based named entity recognizer is provided.

The operation of the NER system 200 comprises receiving, by the compressed NER model-based named entity recognizer 201, an input text 203, which can be a digital document, a text message, or the likes; and performing, by the compressed NER model-based named entity recognizer 201, a first stage NER on the input text 203 to produce a first stage determination of whether named entity(ies) is found. If the first stage determination of existence of named entity(ies) is affirmative, a first stage NER result (the named entity(ies) recognized and their respective class(es) or type(s)) 205 and an accurate recognition probability are generated. If the first stage determination of existence of named entity(ies) is negative, the NER system 200 routes the input text 203 to be processed by the rule based named entity recognizer 206 for a second stage NER. If the first stage determination of existence of named entity(ies) is affirmative but with an accurate recognition probability below a threshold, the NER system 200 is configurable to either route the processing to the second stage NER on the input text 203 or route the first stage NER result 205 to a NER result integrator 208. Otherwise if the first stage determination of existence of named entity(ies) is affirmative with an accurate recognition probability at or above a threshold, the first stage NER result 205 is routed to the NER result integrator 208.

The operation of the NER system 200 further comprises the second stage NER performed by the rule based named entity recognizer 206 to generate a second stage NER result (the named entity(ies) recognized and their respective class(es) or type(s)) 207. In accordance to one embodiment, the NER result integrator 208 integrates both the first stage NER result 205 and the second stage NER result 207 by a union operation. The union operation is to construct a final NER result from the first stage NER result 205 and the second stage NER result 207 if both are not blank, or otherwise from either one that is not blank. In accordance to another embodiment, the NER result integrator 207 integrates both the first stage NER result 205 and the second stage NER result 207 by a selection operation. The selection operation is to construct a final NER result from only the second stage NER result 207 if both the first stage NER result 205 and the second stage NER result 207 are not blank (due to the expected higher recognition accuracy of second stage NER result), or otherwise from either one that is not blank.

Figure 3:
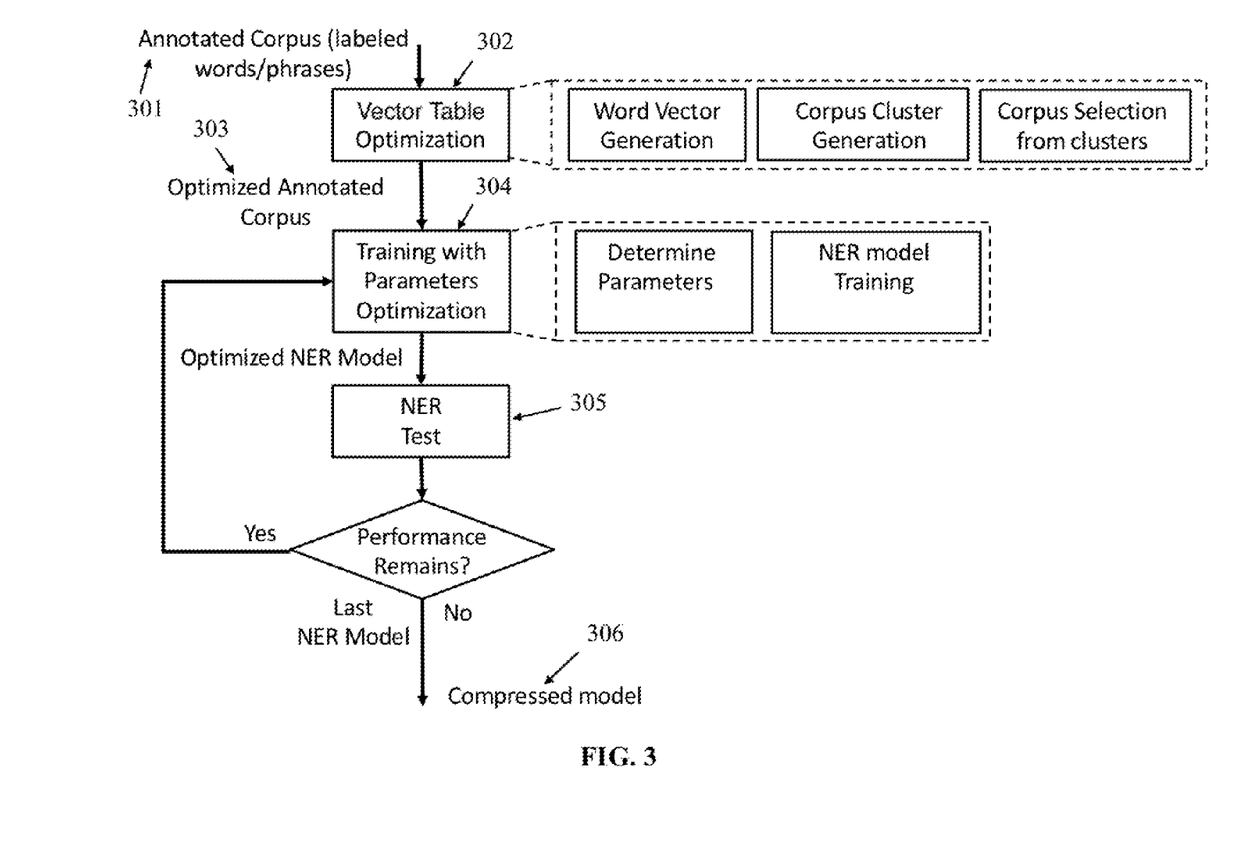
FIG. 3 illustrates the training strategy of a compressed NER model-based named entity recognizer in accordance to one embodiment of the present invention.

Referring to FIG. 3. In accordance to one embodiment, the compressed NER model-based named entity recognizer is trained using a training dataset comprising annotated corpus 301 optimized by a Vector Table Optimization 302 and a parameters optimization 304. The Vector Table Optimization 302 comprises clustering of sentences in a training dataset by word vectors into a configurable number of clusters; a selection of corpus from each cluster for inclusion in the training, wherein the selected corpus has not yet been selected previously for the present training dataset; and the omission of certain data in the training dataset. The annotated corpus 301 is first optimized by the Vector Table Optimization 302 to produce optimized annotated corpus 303 to be further optimized by the parameters optimization 304 to generate a compressed NER model 306 for training the compressed NER model-based named entity recognizer. In one embodiment, the parameters optimization 304 is iteratively applied to the training dataset with each parameters-optimization followed by a NER test 305 then repeats with further parameters optimization until recognition accuracy begins to degrade. Once recognition accuracy begins to degrade noticeably, the compressed NER model 306 before the last one is used to the train the compressed NER model-based named entity recognizer.

In accordance to one embodiment, the omission of data in the training dataset is to use a single word vector to represent words with same or similar meanings. For example, the corpus "in the garden" and "at the park" found in a cluster can be represented by one vector (can be the vector for 'in'; the vector for 'at', or a new vector that is average/median of both 'in' and 'at') for both 'in' and 'at', and another one vector (can be the vector for 'garden'; the vector for 'park', or a new vector that is average/median of both 'garden' and 'park') for both 'garden' and 'park'.

In one embodiment, the parameters optimization 304 comprises one or more of reduction of word vector space dimension of the training dataset; reduction of character vector space dimension of the training dataset; and simplification of the data representation of characters using a lesser-memory-consuming data scheme in place of the multi-dimensional character vectors. In an exemplary embodiment, the least-memory-consuming data scheme is using a single binary bit with a "1" value for a word starting with an uppercase letter and "0" value for a word starting with a lowercase letter. In other words, this exemplary embodiment of reduction of character vector space dimension reduces the character vector space dimension to one dimension. The iterative parameters optimization may take upon one or more schemes to reduce a number of the dimensions of the word vector space dimension and/or character vector space dimension in each iteration. The aim is to iteratively reduce as many dimensions and in turn data memory consumption of the training dataset before recognition accuracy begins to degrade.

Figure 4A:
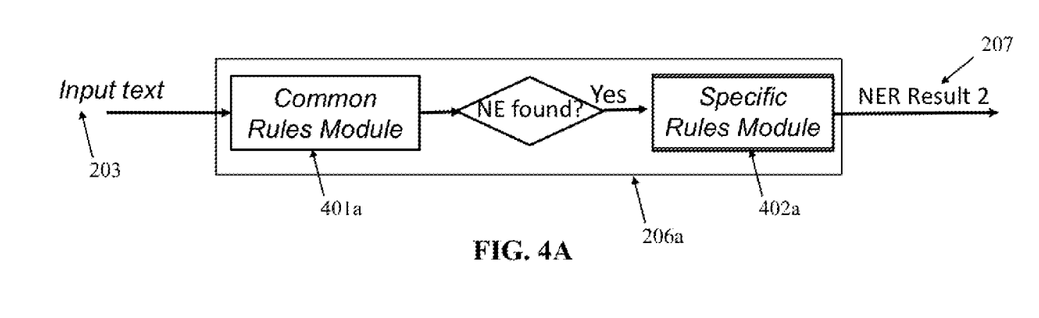
FIG. 4A depicts a logical structural and dataflow diagram of a rule based named entity recognizer in accordance to one embodiment of the present invention.
Figure 4B:
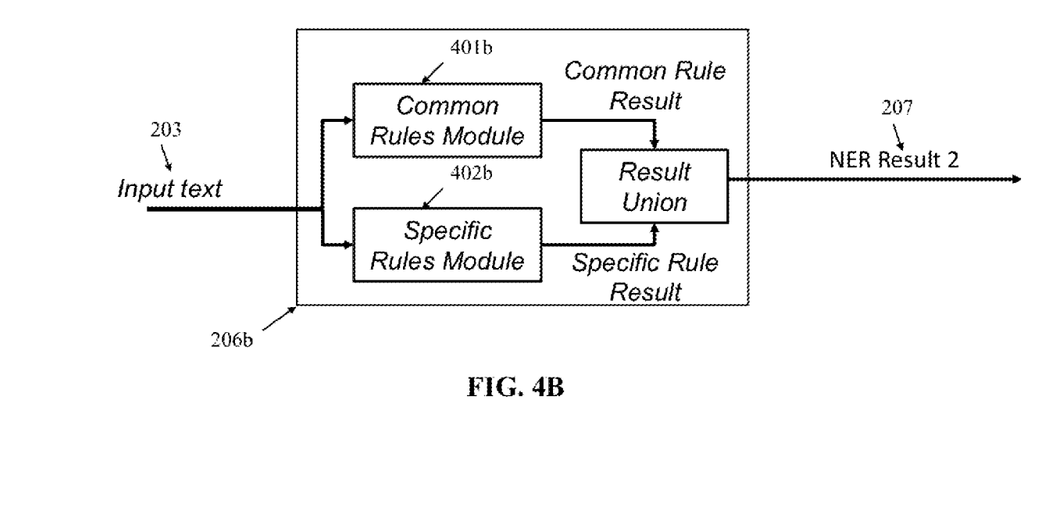
FIG. 4B depicts a logical structural and dataflow diagram of a rule based named entity recognizer in accordance to another embodiment of the present invention.

Referring to FIGS. 4A and 4B. In accordance to one embodiment, the rule based named entity recognizer 206a or 206b comprises a common rules module 401a or 401b and a specific rules module 402a or 402b. The existences of named entities in documents and texts often exhibit certain common features. These common features may include most frequently used words; and POS tagging of words, wherein in accordance to one embodiment the optimal POS tagging is determined by a Genetic Algorithm method. The common rules module is a classifier trained with these common features to recognize named entities in the input text 203.

In accordance to one embodiment, a training strategy for the common rules module 401a or 401b comprises splitting each sentence in a training dataset containing corpus into words for common features determination; extracting the top N words that most frequently appear in the training dataset (top N most frequently used words); building N features using these top N most frequently used words with one label for each instance of each of the top N most frequently used words indicating whether the corresponding sentence of the instance has a named entity. The training dataset for common rules module 401a or 401b can be the same as the annotated training dataset for the compressed NER model-based named entity recognizer.

In accordance to a preferred embodiment, POS tagging as determined by is by a Genetic Algorithm method further applied to the top N words as such that only those words among the top N words with a tag determined are taken into the feature list for training the common rules module. In accordance to another embodiment, the determined POS tags are included in the feature list along with the top N words.

Different classes or types and languages of named entities can have different rules of recognition by regular expression methods. The rules of recognition by regular expression can be obtained from named dictionaries of classes or types and languages of named entities. For example, for geographic location type of named entities in English, the rule of recognition by regular expression may be "all words that begin with capital letters after one of the prepositions (in, on, at, to, from, and towards) is a geographic location." The specific rules module 402a or 402b is another classifier trained with these rules of recognition by regular expression of a specific class or type and language of named entities. In cases where multiple classes or types and/or languages of named entities are to be recognized and extracted from input text 203, multiple rule based named entity recognizers 206a or 206b may be employed, each having a specific rules modules 402a or 402b trained specifically to recognize its respective class or type and language of named entities. The common rules module 401a or 401b, however, needed only be trained once and be re-used in all of the rule based named entity recognizers 206a or 206b.

Referring to FIG. 4A. In accordance to a preferred embodiment, the rule based named entity recognizer 206a is arranged such that its common rules module 401a and specific rules module 402b operate serially. In this embodiment, the input text 203 is received only by the common rules module 401a for NER and the result is a determination of whether the input text 203 contains named entity(ies); and if so, the input text 203 is processed by the specific rules module 402b for NER to generate the second stage NER result 207.

Referring to FIG. 4B. In accordance to an alternative embodiment, the rule based named entity recognizer 206b is arranged such that its common rules module 401b and specific rules module 402b operate in parallel. In this embodiment, the input text 203 is received by both the common rules module 401b and specific rules module 402b for NER and the results are recognized and extracted named entity(ies). The recognized and extracted named entity(ies) are then combined in a union operation to generate the second stage NER result 207.

The embodiments disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

All or portions of the electronic embodiments may be executed in one or more general purpose or computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for recognizing and extracting named entities in a natural language input text processing comprising:
performing, by a compressed named entities recognition (NER)-model-based named entity recognizer, a first stage NER on the input text to generate a first stage determination of whether at least one named entity exists in the input text;
if the first stage NER determines no named entity exists in the input text, performing, by a rule based named entity recognizer, a second stage NER on the input text to generate a second stage NER result, wherein if the second stage NER determines at least one named entity exists in the input text, the second stage NER result comprises one or more pairs of named entity and its corresponding class or type;
if the first stage NER determines at least one named entity exists in the input text, generating, by the compressed NER-model-based named entity recognizer, a first stage NER result, wherein the first stage NER result comprises one or more pairs of named entity and its corresponding class or type; and
integrating, by a NER result integrator, the first stage NER result and the second stage NER result to generate a final NER result;
wherein the compressed NER-model-based named entity recognizer is trained using a compressed NER model generated from a training dataset optimized by a Vector Table Optimization or a parameters optimization;
wherein the Vector Table Optimization comprises:
clustering of sentences in the training dataset by word vectors into a configurable number of clusters;
selecting corpus from each of the clusters for inclusion in the training, wherein the selected corpus has not yet been selected previously for the training dataset; and
omitting a portion of the training dataset in the training; and
wherein the parameters optimization comprises one or more of:
reducing word vector space dimension of the training dataset;
reducing character vector space dimension of the training dataset; and
simplifying data representation of characters using a lesser-memory-consuming data scheme in place of multi-dimensional character vectors in the training dataset.

2. The method of claim 1, further comprising:
if the first stage NER determines at least one named entity exists in the input text, generating, by the compressed NER-model-based named entity recognizer, an accurate recognition probability; and
if the accurate recognition probability is below a threshold, performing, by the rule based named entity recognizer, the second stage NER on the input text to generate the second stage NER result.

3. The method of claim 1, wherein the integration of the first stage NER result and the second stage NER result to generate the final NER result is a union operation, comprising:
constructing the final NER result from the first stage NER result and the second stage NER result if both are not blank;
constructing the final NER result from the first stage NER result if the second stage NER result is blank; and
constructing the final NER result from the second stage NER result if the first stage NER result is blank.

4. The method of claim 1, wherein the integration of the first stage NER result and the second stage NER result to generate the final NER result, is a selection optioning, comprising:
constructing the final NER result from the second stage NER result if both are not blank;
constructing the final NER result from the first stage NER result if the second stage NER result is blank; and
constructing the final NER result from the second stage NER result if the first stage NER result is blank.

5. The method of claim 1, wherein the rule based named entity recognizer comprises a common rules module and a specific rules module;
wherein the common rules module is a NER classifier trained with one or more common features including top N number of most frequently used words and part-of-speech (POS) tagging of each word in a training dataset for the common rules module;
wherein the common features are obtained from the training dataset for the common rules module by:
splitting sentences in the training dataset for the common rules module into individual words; and
extracting top N words that most frequently appear in the training dataset for the common rules module as the top N number of most frequently used words; and
assigning a POS tag for each of the individual words;
wherein the specific rules module is configured to perform NER on the input text by regular expression identification specific to a named entity class or type and a language to generate a second NER result; and
wherein the first and the second NER results are combine in a union operation to generate the generated second stage NER result.

6. The method of claim 1, wherein the rule based named entity recognizer comprises a common rules module and a specific rules module;
wherein the common rules module is a NER classifier trained with one or more common features including top N number of most frequently used words and part-of-speech (POS) tagging of each word in a training dataset for the common rules module;
wherein the common features are obtained from the training dataset for the common rules module by:
splitting sentences in the training dataset for the common rules module into individual words; and
extracting top N words that most frequently appear in the training dataset for the common rules module as the top N number of most frequently used words; and
assigning a POS tag for each of the individual words;
wherein the specific rules module is configured to perform NER on the input text by regular expression identification specific to a named entity class or type and language; and
wherein the common rules module and specific rules module perform the respective NER on the input text serially first by the common rules module to generate a determination of whether the input text contains at least one named entity; and if so second by the specific rules module to generate the second stage NER result.

7. An apparatus for recognizing and extracting named entities in a natural language input text processing comprising:

a compressed named entities recognition (NER)-model-based named entity recognizer, configured to perform a first stage NER on the input text to generate a first stage determination of whether at least one named entity exists in the input text, wherein if the first stage NER determines at least one named entity exists in the input text, generate a first stage NER result, the first stage NER result comprises one or more pairs of named entity and its corresponding class or type;

a rule based named entity recognizer, configured to perform a second stage NER on the input text to generate a second stage NER result if the first stage NER determines no named entity exists in the input text, wherein if the second stage NER determines at least one named entity exists in the input text, generate a second stage NER result, the second stage NER result comprises one or more pairs of named entity and its corresponding class or type; and a NER result integrator, configured to integrate the first stage NER result and the second stage NER result to generate a final NER result;

wherein the compressed NER-model-based named entity recognizer is trained using a compressed NER model generated from a training dataset optimized by a Vector Table Optimization or a parameters optimization;

wherein the Vector Table Optimization comprises:
  clustering of sentences in the training dataset by word vectors into a configurable number of clusters;
  selecting corpus from each of the clusters for inclusion in the training, wherein the selected corpus has not yet been selected previously for the training dataset; and
  omitting a portion of the training dataset in the training; and wherein the parameters optimization comprises one or more of:
  reducing word vector space dimension of the training dataset;
  reducing character vector space dimension of the training dataset; and
  simplifying data representation of characters using a lesser-memory-consuming data scheme in place of multi-dimensional character vectors in the training dataset.

8. The apparatus of claim 7,
wherein the compressed NER-model-based named entity recognizer is further configured to generate an accurate recognition probability if the first stage NER determines at least one named entity exists in the input text; and
wherein the rule based named entity recognizer is further configured to perform the second stage NER on the input text to generate the second stage NER result if the accurate recognition probability is below a threshold.

9. The apparatus of claim 7, wherein the integration of the first stage NER result and the second stage NER result to generate the final NER result is a union operation, comprising:
  constructing the final NER result from the first stage NER result and the second stage NER result if both are not blank;
  constructing the final NER result from the first stage NER result if the second stage NER result is blank; and
  constructing the final NER result from the second stage NER result if the first stage NER result is blank.

10. The apparatus of claim 7, wherein the integration of the first stage NER result and the second stage NER result to generate the final NER result, is a selection optioning, comprising:
  constructing the final NER result from the second stage NER result if both are not blank;
  constructing the final NER result from the first stage NER result if the second stage NER result is blank; and
  constructing the final NER result from the second stage NER result if the first stage NER result is blank.

11. The apparatus of claim 7, wherein the rule based named entity recognizer comprises a common rules module and a specific rules module;
  wherein the common rules module is a NER classifier trained with one or more common features including top N number of most frequently used words and part-of-speech (POS) tagging of each word in a training dataset for the common rules module;
  wherein the common features are obtained from the training dataset for the common rules module by:
    splitting sentences in the training dataset for the common rules module into individual words; and
    extracting top N words that most frequently appear in the training dataset for the common rules module as the top N number of most frequently used words; and
    assigning a POS tag for each of the individual words;
  wherein the specific rules module is configured to perform NER on the input text by regular expression identification specific to a named entity class or type and a language to generate a second NER result; and
  wherein the first and the second NER results are combine in a union operation to generate the generated second stage NER result.

12. The apparatus of claim 7, wherein the rule based named entity recognizer comprises a common rules module and a specific rules module;
  wherein the common rules module is a NER classifier trained with one or more common features including top N number of most frequently used words and part-of-speech (POS) tagging of each word in a training dataset for the common rules module;
  wherein the common features are obtained from the training dataset for the common rules module by:
    splitting sentences in the training dataset for the common rules module into individual words; and
    extracting top N words that most frequently appear in the training dataset for the common rules module as the top N number of most frequently used words; and
    assigning a POS tag for each of the individual words;
  wherein the specific rules module is configured to perform NER on the input text by regular expression identification specific to a named entity class or type; and
  wherein the common rules module and specific rules module perform the respective NER on the input text serially first by the common rules module to generate a determination of whether the input text contains at least one named entity; and if so second by the specific rules module to generate the second stage NER result.

13. An apparatus for recognizing and extracting named entities in a natural language input text processing comprising:
  a rule based named entity recognizer, configured to perform a named entities recognition (NER) on the input text to generate a first NER result, wherein if the first NER determines at least one named entity exists in the input text, the first NER result comprises one or more pairs of named entity and its corresponding class or type;

wherein the rule based named entity recognizer comprises a common rules module and a specific rules module;

wherein the common rules module is a NER classifier trained with one or more common features including top N number of most frequently used words and part-of-speech (POS) tagging of each word in a training dataset for the common rules module;

wherein the common features are obtained from the training dataset for the common rules module by:
  splitting sentences in the training dataset for the common rules module into individual words; and
  extracting top N words that most frequently appear in the training dataset for the common rules module as the top N number of most frequently used words; and
  assigning a POS tag for each of the individual words; and wherein the specific rules module is configured to perform a second NER on the input text by regular expression identification specific to a named entity class or type and a language to generate a second NER result.

14. The apparatus of claim 13, wherein the common rules module and the specific rules module are configured to operate serially;

wherein the common rules module is further configured to first receive the input text for the first NER to generate the first NER result comprising a determination of whether the input text contains at least one named entity;

wherein the specific rules module is further configured to receive the input text for the second NER to generate the second NER result if the first determination indicates the input text contains at least one named entity; and wherein the second NER result comprises one or more pairs of named entity and its corresponding class or type if the second NER determines at least one named entity exists.

15. The apparatus of claim 13, wherein the common rules module and the specific rules module are configured to operate in parallel;

wherein the common rules module and the specific rules module are configured to receive the input text and perform the first and the second NERs respectively on the input text to generate the first and the second results respectively; and wherein the apparatus for recognizing and extracting named entities is further configured to combine the first and the second results in a union operation to generate a final NER result.

* * * * *